United States Patent
Wang et al.

(10) Patent No.: US 9,391,547 B2
(45) Date of Patent: Jul. 12, 2016

(54) SINGLE PHASE MOTOR DRIVE CIRCUIT, SINGLE PHASE MOTOR APPARATUS, APPARATUS HAVING FAN

(71) Applicant: KABUSHIKI KAISHA TOSHIBA, Minato-ku, Tokyo (JP)

(72) Inventors: Shen Wang, Kanagawa-ken (JP); Tadashi Asukai, Kanagawa-ken (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 313 days.

(21) Appl. No.: 13/776,394

(22) Filed: Feb. 25, 2013

(65) Prior Publication Data
US 2014/0062355 A1 Mar. 6, 2014

(30) Foreign Application Priority Data
Aug. 29, 2012 (JP) .................. 2012-188467

(51) Int. Cl.
| H02P 6/16 | (2006.01) |
| H05K 7/20 | (2006.01) |
| H02P 6/14 | (2016.01) |
| H02P 6/00 | (2016.01) |
| H02P 6/08 | (2016.01) |

(52) U.S. Cl.
CPC ...... *H02P 6/14* (2013.01); *H02P 6/008* (2013.01); *H02P 6/165* (2013.01); *H02P 6/08* (2013.01); *H02P 6/085* (2013.01)

(58) Field of Classification Search
CPC .......... H02P 6/14; H02P 6/142; H02P 6/145; H02P 6/147; H02P 6/008; H02P 6/165; H02P 6/16; H02P 7/29; H02P 6/08; H02P 6/085; H05K 7/20

USPC ............................. 318/400.04; 361/695
See application file for complete search history.

(56) References Cited

U.S. PATENT DOCUMENTS

| 6,242,875 B1 | 6/2001 | Kusaka et al. |
| 7,002,307 B2 * | 2/2006 | Yoshitomi et al. ....... 318/400.29 |

(Continued)

FOREIGN PATENT DOCUMENTS

| JP | 08331882 A | 12/1996 |
| JP | 09294389 A | 11/1997 |

(Continued)

OTHER PUBLICATIONS

Japanese Office Action (and English translation thereof) dated Jul. 3, 2015, issued in counterpart Japanese Application No. 2012-188467.

(Continued)

*Primary Examiner* — Bentsu Ro
*Assistant Examiner* — Zemenay Truneh
(74) *Attorney, Agent, or Firm* — Holtz, Holtz & Volek PC

(57) ABSTRACT

According to an embodiment, single phase motor drive circuit includes a counter unit, an energization pattern generation unit, and a drive unit. The unit counts a time of phase switching of a Hall signal based on a clock signal. The energization pattern generation unit generates an energization pattern based on the count result of the counter unit. The drive unit generates a pulse width modulation (PWM) signal based on a duty setting signal and the energization pattern signal to output an output signal to drive a single phase motor based on the PWM signal.

16 Claims, 12 Drawing Sheets

(56) References Cited

U.S. PATENT DOCUMENTS

| | | | |
|---|---|---|---|
| 7,009,351 B2 | 3/2006 | Yoshitomi et al. | |
| 7,590,334 B2* | 9/2009 | Yabusaki et al. | 388/811 |
| 7,747,146 B2* | 6/2010 | Milano et al. | 388/811 |
| 7,795,827 B2* | 9/2010 | Jeung | 318/400.04 |
| 8,093,844 B2* | 1/2012 | Milesi et al. | 318/362 |
| 9,071,179 B2* | 6/2015 | Ishikawa | H02P 6/002 |
| 2003/0198464 A1* | 10/2003 | Horng | H02P 6/08 |
| | | | 388/831 |
| 2008/0272724 A1* | 11/2008 | Hayashi | 318/430 |
| 2010/0007296 A1* | 1/2010 | Hsu | H02P 6/085 |
| | | | 318/400.29 |
| 2010/0308760 A1* | 12/2010 | Nakamura | 318/400.11 |
| 2011/0234129 A1* | 9/2011 | Shimizu et al. | 318/400.04 |
| 2011/0260669 A1* | 10/2011 | Nakahata et al. | 318/503 |
| 2011/0279072 A1* | 11/2011 | Shimizu et al. | 318/400.04 |
| 2011/0279975 A1* | 11/2011 | Shimizu et al. | H02P 7/29 |
| | | | 361/695 |
| 2013/0175957 A1 | 7/2013 | Ishikawa | |
| 2014/0042942 A1* | 2/2014 | Hiraki et al. | 318/400.13 |

FOREIGN PATENT DOCUMENTS

| | | |
|---|---|---|
| JP | 2000-287477 A | 10/2000 |
| JP | 2004-153921 A | 5/2004 |
| JP | 2010-104115 A | 5/2010 |
| JP | 2011-019386 A | 1/2011 |
| JP | 2011151997 A | 8/2011 |
| JP | 2011-223857 A | 11/2011 |
| JP | 2011-223861 A | 11/2011 |
| JP | 2011-229345 A | 11/2011 |
| WO | 2012090423 A1 | 7/2012 |

OTHER PUBLICATIONS

Japanese Office Action (and English translation thereof) dated Mar. 4, 2016, issued in counterpart Japanese Application No. 2012-188467.

* cited by examiner

SINGLE PHASE MOTOR DRIVE CIRCUIT, SINGLE PHASE MOTOR APPARATUS, APPARATUS HAVING FAN

CROSS REFERENCE TO RELATED APPLICATION

This application is based upon and claims the benefit of priority from the prior Japanese Patent Application No. 2012-188467, filed on Aug. 29, 2012, the entire contents of which are incorporated herein by reference.

FIELD

Embodiments described herein relate to a single phase motor drive circuit, a single phase motor apparatus, and an apparatus having a fan.

BACKGROUND

A single phase motor is frequently used in a ventilation fan, a refrigerator, a personal computer (PC) and the like. A single phase motor drive circuit to drive the single phase motor has a problem of low drive efficiency, because a drive current less contributes to a torque upon switching. In addition, a single phase motor drive has a problem that an oscillation and a noise grow by a change in a current direction as compared with a three-phase motor.

DETAILED DESCRIPTION OF THE INVENTION

Figure 1:
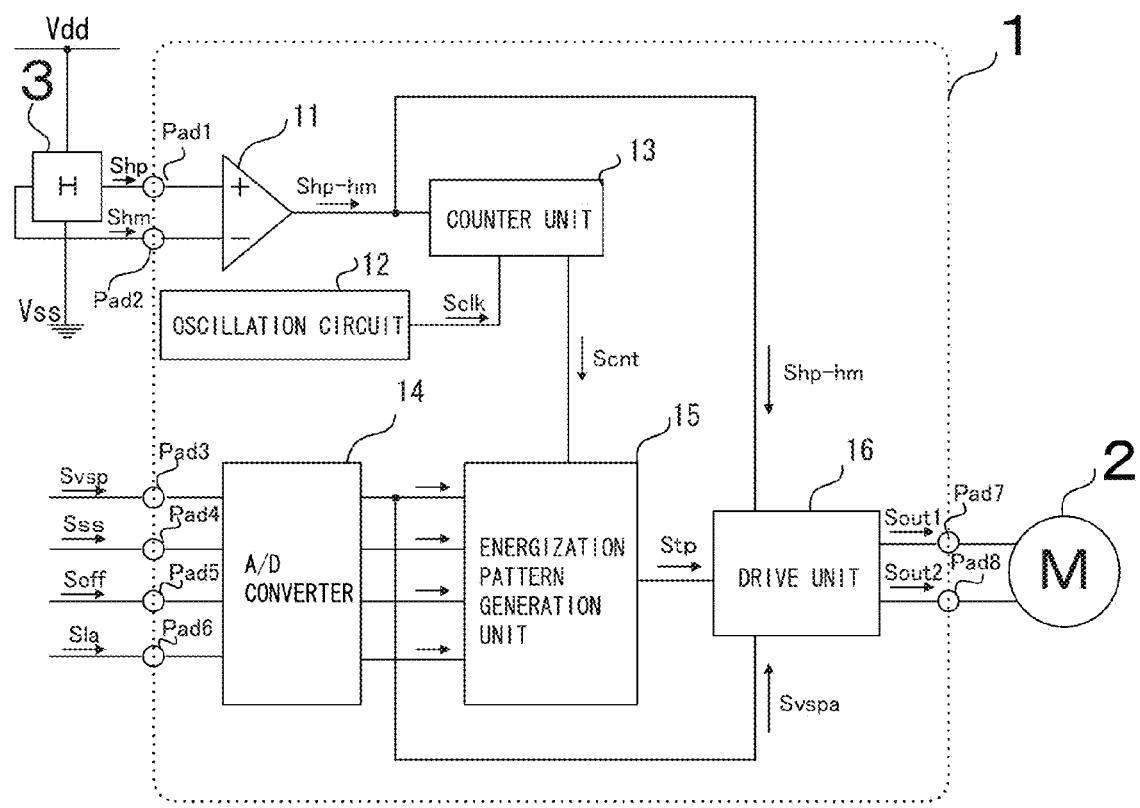
FIG. 1 is a block diagram of a schematic configuration of a single phase motor apparatus according to a first embodiment.

According to an embodiment, single phase motor drive circuit includes a counter unit, an energization pattern generation unit, and a drive unit. The unit counts a time of phase switching of a Hall signal based on a clock signal. The energization pattern generation unit generates an energization pattern based on the count result of the counter unit. The drive unit generates a pulse width modulation (PWM) signal based on a duty setting signal and the energization pattern signal to output an output signal to drive a single phase motor based on the PWM signal.

Hereinafter, a plurality of further embodiments will be described with reference to the drawings. In the drawings, the same reference symbol indicates the same or similar portion.

Figure 2:
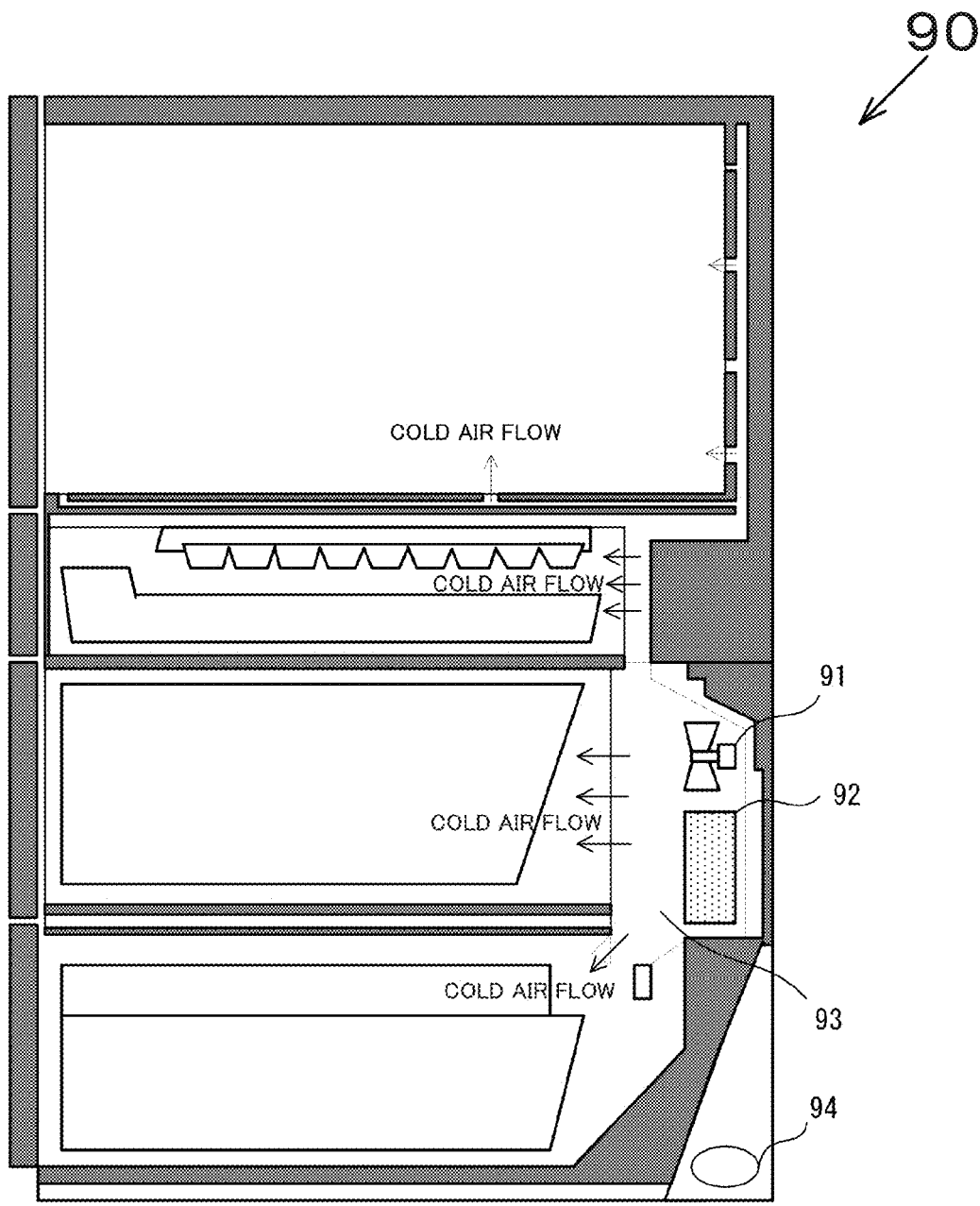
FIG. 2 is a block diagram of a schematic configuration of a refrigerator according to the first embodiment.
Figure 3:
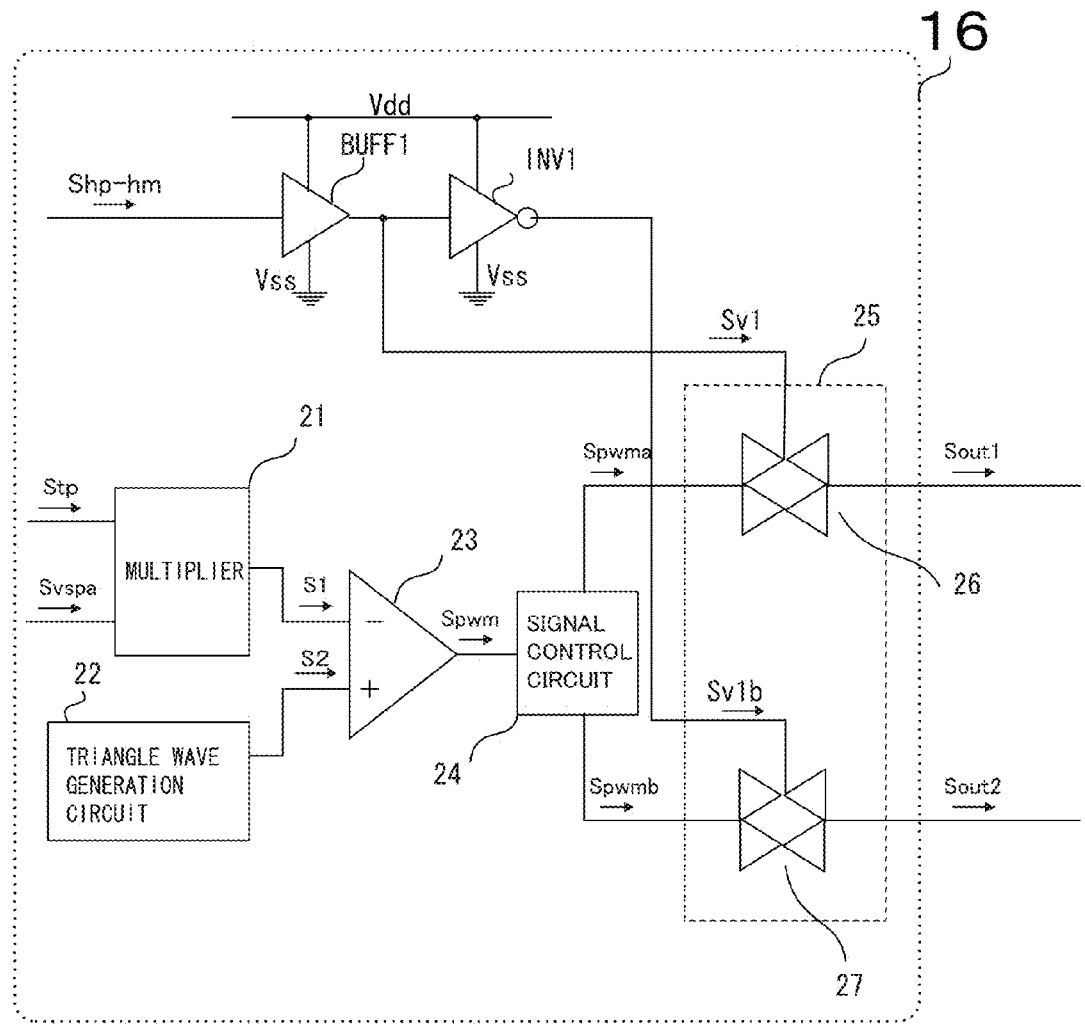
FIG. 3 is a circuit diagram showing a configuration of a drive unit according to the first embodiment.

A first embodiment will be described with reference to FIGS. 1 to 7. A single phase motor drive circuit, a single phase motor apparatus, and an apparatus having a fan according to the first embodiment will be described with reference to FIGS. 1 to 7. FIG. 1 is a block diagram of a schematic configuration of a single phase motor apparatus. FIG. 2 is a block diagram of a schematic configuration of a refrigerator. FIG. 3 is a circuit diagram showing a configuration of a drive unit. In the first embodiment, a cycle of a Hall signal is counted, a 180 degree energization pattern (a half cycle energization pattern) is generated based on a 180 degree time (a half cycle time) of the Hall signal before the energization pattern is generated, and soft switching operations are performed before and after phase switching of the Hall signal, thereby reducing power consumption.

As shown in FIG. 1, a single phase motor apparatus includes a single phase motor drive circuit 1, a single phase motor 2, and a position detection sensor. Here, a Hall element 3 is used as the position detection sensor.

The Hall element 3 is connected to a high potential power source Vdd at one end and to a low potential power source (ground potential) Vss at the other end, and generates a Hall signal Shp and a Hall signal Shm having an opposite phase of the Hall signal Shp.

The single phase motor drive circuit 1 performs soft switching operations before and after phase switching of the Hall signal, thereby reducing power consumption in the single phase motor drive. The single phase motor drive circuit 1 can reduce the oscillation and the noise by the soft switching operations. Since the single phase motor drive circuit 1 uses only a cycle information of the Hall signal Shp and the Hall signal Shm, an increase of circuit scale of the single phase motor drive circuit 1 can be significantly suppressed. In addition, effects of a variation and temperature properties of the Hall element 3 can be significantly suppressed. The soft switching operation will be described later in detail.

The single phase motor drive circuit 1 includes a comparator 11, an oscillation circuit 12, a counter unit 13, an analog-to-digital (A/D) converter 14, an energization pattern generation unit 15, a drive unit 16 and terminals Pad1 through Pad8.

In the comparator 11, the Hall signal Shp is input to a plus (+) port at an input side via the terminal Pad1, and the Hall signal Shm having an opposite phase of the Hall signal Shp is input to a minus (−) port at an input side via the terminal Pad2. The comparator 11 compares the Hall signal Shp and the Hall signal Shm with each other, and generates a comparator output signal Shp-hm obtained by comparing and amplifying the Hall signal Shp and the Hall signal Shm. The comparator output signal Shp-hm becomes a "High" level signal when the Hall signal Shp is greater than the Hall signal Shm, and becomes a "Low" level signal when the Hall signal Shp is lower than the Hall signal Shm.

The oscillation circuit 12 generates a clock signal Sclk. The clock signal Sclk is set to have several digits higher frequency than those of the Hall signal Shp and the Hall signal Shm.

The comparator output signal Shp-hm and the clock signal Sclk are input to the counter unit 13. The counter unit 13 counts phase switching time of the Hall signal based on the clock signal Sclk, and outputs the count result as a count signal Scnt. Specifically, the counter unit 13 counts a "High" level period (a first phase switching time) and a "Low" level period (a second phase switching time) of the comparator output signal Shp-hm, respectively.

A duty setting signal Svsp is input to the A/D converter 14 via the terminal Pad3. A soft switching period setting signal Sss is input to the A/D converter 14 via the terminal Pad4. An off period setting signal Soff is input to the A/D converter 14 via the terminal Pad5. A lead angle period setting signal Sla is input to the A/D converter 14 via the terminal Pad6. The signals are analog-to-digital converted. The plurality of signals analog-to-digital converted are output to the energization pattern generation unit 15.

The plurality of signals analog-to-digital converted and the count signal Scnt are input to the energization pattern generation unit 15. The energization pattern generation unit 15 uses the plurality of signals analog-to-digital converted and the count signal Scnt to generate a 180 degree energization pattern based on a 180 degree time of the Hall signal immediately before the energization pattern is generated. Then, the energization pattern generation unit 15 outputs an energization pattern signal Stp. The "180 degree time" herein corresponds to the "High" level period or the "Low" level period of the Hall signal Shp or the Hall signal Shm. In other words, the 180 degree time corresponds to a half cycle of one cycle (360 degrees) of the Hall signal Shp or the Hall signal Shm. The "180 degree energization pattern" is used to adequately drive the single phase motor 2 for the 180 degree time. According to the embodiment, the 180 degree energization pattern is applied to soft switching drive of the single phase motor 2. The energization pattern signal Stp will be described later in detail.

As shown in FIG. 3, the energization pattern signal Stp, a duty setting signal Svspa that has been analog-to-digital converted, and the comparator output signal Shp-hm are input to the drive unit 16. The drive unit 16 generates an output signal Sout1 (a first output signal) and an output signal Sout2 (a second output signal) that is shifted at 180 degrees to the output signal Sout1 (the first output signal), and outputs the output signal Sout1 and the output signal Sout2 to the single phase motor 2.

The drive unit 16 includes a multiplier 21, a triangle wave generation circuit 22, a pulse width modulation circuit 23, a signal control circuit 24, an output unit 25, a buffer BUFF1, and an inverter INV1.

The energization pattern signal Stp and the duty setting signal Svspa are input to the multiplier 21. The multiplier 21 multiplies the energization pattern signal Stp and the duty setting signal Svspa, and outputs a multiplied result as a signal S1. The triangle wave generation circuit 22 generates a triangle wave signal, and outputs the triangle wave signal as a signal S2.

The signal S1 and the signal S2 are input to the pulse width modulation circuit 23. The pulse width modulation circuit 23 generates a PWM signal Spwm to change the duty ratio.

The high potential power source Vdd and the low potential power source (ground potential) Vss are provided to the buffer BUFF1. The buffer BUFF1 drives the comparator output signal Shp-hm, and outputs a driven signal Sv1. The high potential power source Vdd and the low potential power source (ground potential) Vss are provided to the inverter INV1. The inverter INV1 outputs a signal Sv1b obtained by reversing the signal Sv1.

The PWM signal Spwm is input to the signal control circuit 24. The signal control circuit 24 generates a PWM signal Spwma and a PWM signal Spwmb. The PWM signal Spwma is used as the PWM signal Spwm only during a period when the output signal Sout1 to be switching-driven is generated, and is set to the "High" level during a period other than the above-described period. The PWM signal Spwmb is used as the PWM signal Spwm only during a period when the output signal Sout2 to be switching-driven is generated, and is set to the "High" level during a period other than the above-described period. The PWM signal Spwmb has the period of being an enable signal (PWM signal Spwm) different from that of the PWM signal Spwma.

The output unit 25 includes an H bridge circuit 26 and an H bridge circuit 27. The H bridge circuit 26 includes a first high-side transistor where the PWM signal Spwma is input to a gate, and a first low-side transistor where the signal Sv1 is input to a gate. A pair of, or a plurality pairs of the first high-side transistor and the first low-side transistor are provided. The H bridge circuit 27 includes a second high-side transistor where the PWM signal Spwmb is input to a gate, and a second low-side transistor where the signal Sv1b is input to a gate. A pair of, or a plurality pairs of the second high-side transistor and the second low-side transistor are provided.

When the PWM signal Spwma is used as the PWM signal Spwm and the signal Sv1 is the "Low" level, the H bridge circuit 26 outputs the output signal Sout1 switching-driven. When the PWM signal Spwma is the "High" level and the signal Sv1 is the "High" level, the first low-side transistor is turned on and the H bridge circuit 26 outputs the "Low" level output signal Sout1.

When the PWM signal Spwmb is used as the PWM signal Spwm and the signal Sv1b is the "Low" level, the H bridge circuit 27 outputs the output signal Sout2 switching-driven. When the PWM signal Spwmb is the "High" level and the signal Sv1b is the "High" level, the second low-side transistor is turned on and the H bridge circuit 27 outputs the "Low" level output signal Sout2.

The single phase motor is applied to a ventilation fan, a refrigerator, and a personal computer (PC), for example. According to the embodiment, the single phase motor is, for example, applied to a refrigerator including a fan as shown in FIG. 2. Specifically, the refrigerator 90 includes a fan 91, a cooler 92, a cooling compartment 93, and a refrigerant compressor 94.

The refrigerant compressor 94 is positioned at the lower right of the refrigerator 90. The cooler 92 is positioned at the center of the right end of the refrigerator 90 via a housing, and disposed in the cooling compartment 93. The cooler 92 generates cold air. The fan 91 is positioned at the right end center of the refrigerator 90 via the housing and in the cooling compartment 93. The fan 91 blows the cold air generated by the cooler 92 into a refrigerating room, a freezing room, and the like within the refrigerator 90. The fan 91 includes the single phase motor drive circuit 1, the single phase motor 2, the Hall element 3, and the fan.

In the single phase motor drive circuit 1 used in the refrigerator 90, an increase in the circuit scale is significantly suppressed, the power consumption in the single phase motor drive is reduced, and the oscillation and the noise are reduced by the soft switching operations as compared with the related art.

Thus, an occupied area of the fan 91 can be reduced and the power consumption of the fan 91 can be reduced, thereby providing a low-noise refrigerator 90.

Figure 4:
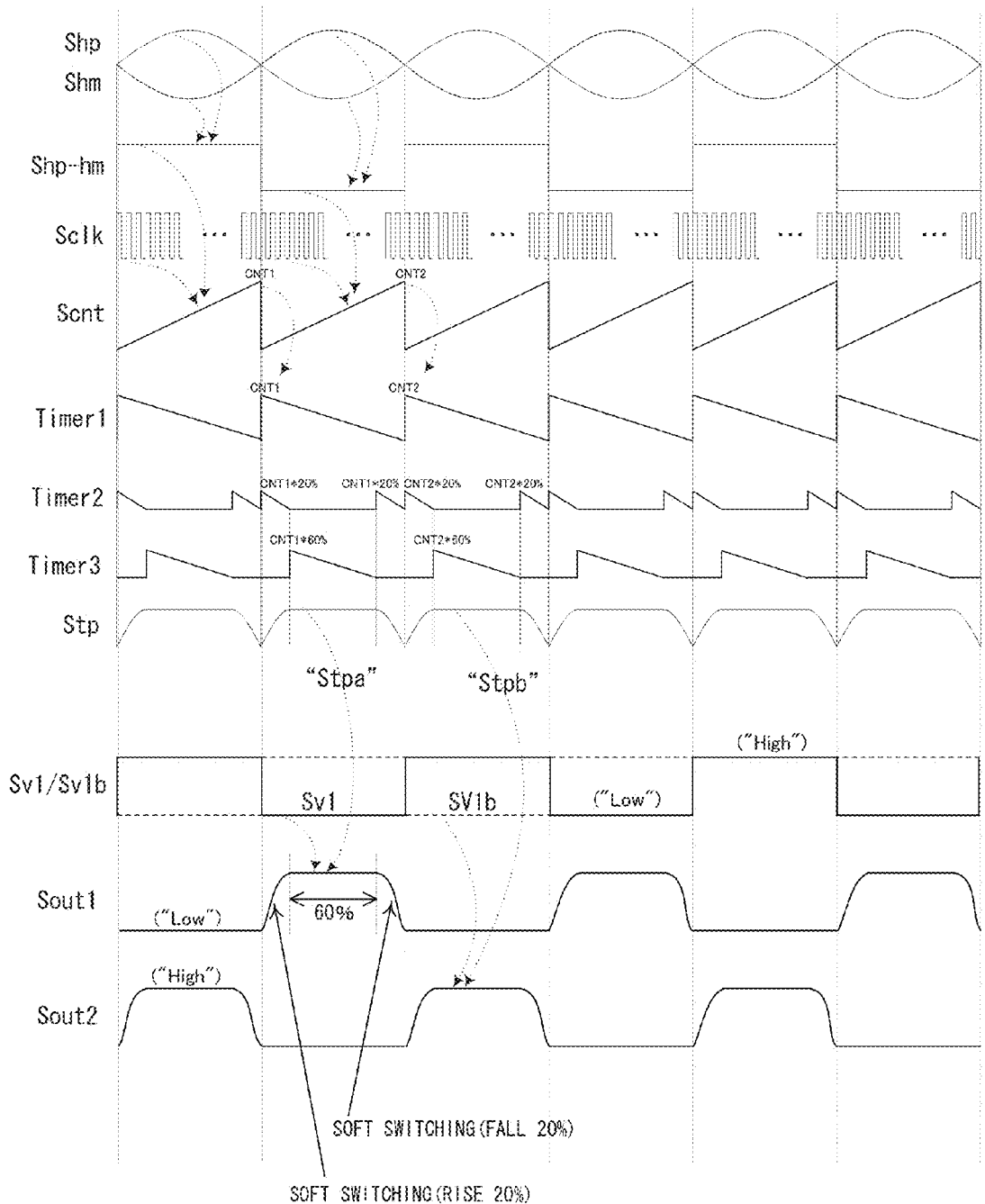
FIG. 4 is a timing chart showing an operation of a single phase motor drive circuit according to the first embodiment.
Figure 5:
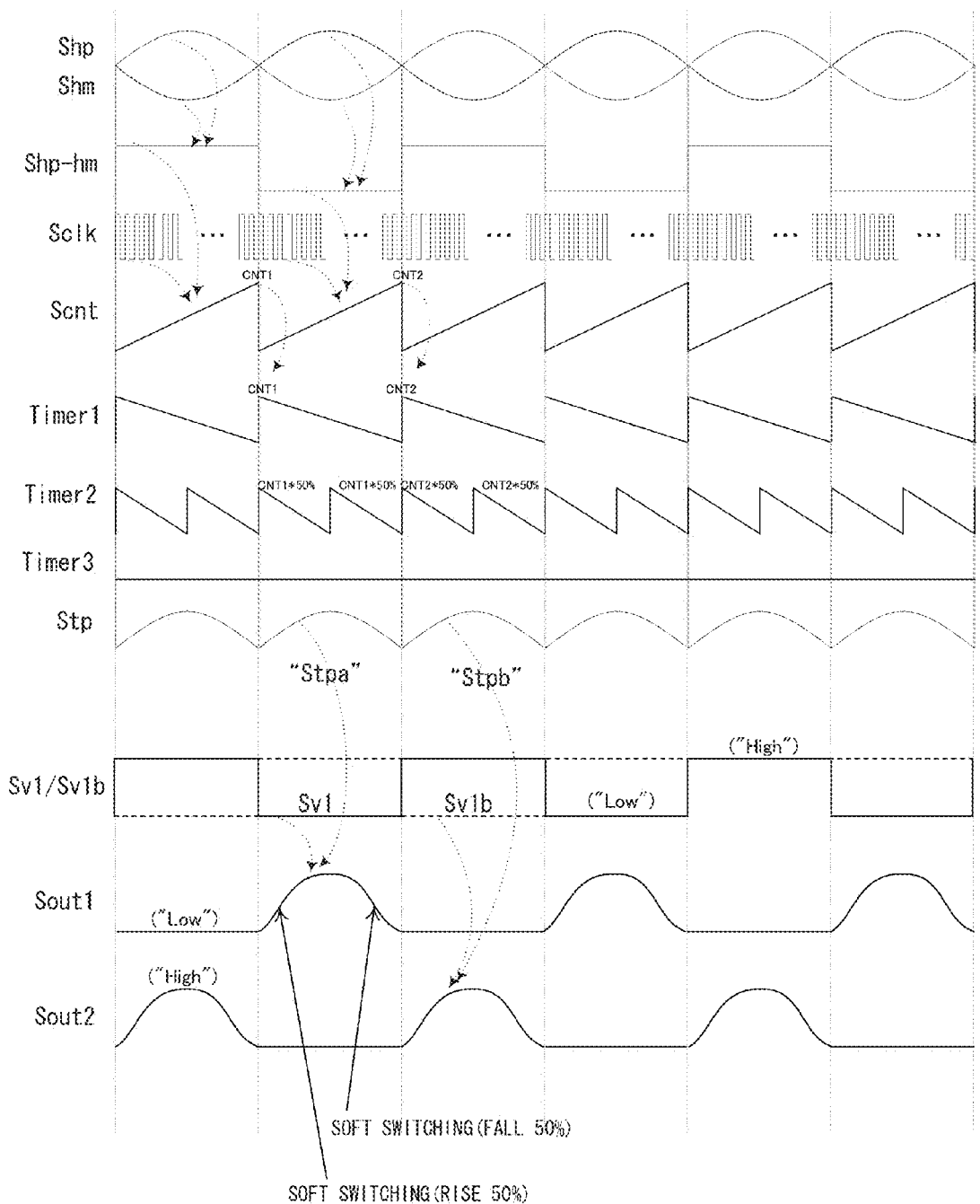
FIG. 5 is a timing chart showing an operation of the single phase motor drive circuit according to the first embodiment.

Then, an operation of the single phase motor drive circuit according to the embodiment will be described referring to FIGS. 4 and 5. FIGS. 4 and 5 are each a timing chart showing an operation of the single phase motor drive circuit. In FIG. 4, the soft switching driving (Period 20%) is performed before and after phase switching of the Hall signal. In FIG. 5, the soft switching driving (Period 50%, half cycle of sine wave drive) is performed before and after phase switching of the Hall signal. "Period %" herein means the percentage taken the 180 degrees time (the half cycle time) as 100%.

As shown in FIG. 4, in the single phase motor drive circuit 1, the soft switching driving is performed before and after phase switching of the Hall signal. Specifically, the comparator 11 compares the Hall signal Shp and the Hall signal Shm with each other, and generates the comparator output signal Shp-hm obtained by comparing and amplifying the Hall signal Shp and the Hall signal Shm. In the comparator output signal Shp-hm, the 180 degree "High" level period and the 180 degree "Low" level period are generated alternately.

Based on the 180 degree "High" level period of the comparator output signal Shp-hm and the clock signal Sclk, the counter unit 13 counts a count value CNT1.

A Timer1 is a lead angle period setting timer in the energization pattern generation unit 15. The Timer1 counts down the count value CNT1 counted in a former 180 degree time during a subsequent 180 degree time. In other words, the count value is CNT1 at 0% time of the subsequent 180 degree time, and the count value is 0 (zero) at 100% time of the subsequent 180 degree time.

A Timer2 is a soft switching period setting timer in the energization pattern generation unit 15. The Timer2 sets the soft switching driving for Period 20% before and after phase switching of the Hall signal during the subsequent 180 degree time ((the count value CNT1×Period 20% after phase switching+the count value CNT1×Period 20% before phase switching) of countdown operations).

A Timer3 is a normal energization period setting timer in the energization pattern generation unit 15. The Timer3 sets a normal energization period (the count value CNT1×Period 60%) during the subsequent 180 degree time. Specifically, the count value CNT1×Period 60% is counted down at Period 20% of the subsequent 180 degree time, and the count value becomes 0 (zero) at Period 80% of the subsequent 180 degree time.

By setting, the previous 180 degree time (the count value CNT1), the soft switching periods (the count value CNT1×Period 20%×2), and the normal energization period (the count value CNT1×Period 60%), the energization pattern generation unit 15 generates the energization pattern signal Stp. The energization pattern signal Stp gently rises (Period 20%) and falls (Period 20%) (in FIG. 4, the signal is denoted as an energization pattern signal "Stpa"). In the energization pattern signal Stpa, Period 60% is the "High" level period.

In the drive unit 16, the H bridge circuit 26 is soft-switching-driven according to the "Low" level signal Sv1 and the "energization pattern signal Stpa" to output the output signal Sout1 soft-switching-driven. The output signal Sout1 rises (Period 20%) and falls (Period 20%) in a gentle waveform before and after phase switching of the Hall signal. During the periods, the low-side transistor of the H bridge circuit 27 is on, and the output signal Sout2 becomes the "Low" level.

Then, the counter unit 13 counts a counter value CNT2 based on the 180 degree "Low" level period of the comparator output signal Shp-hm and the clock signal Sclk.

The Timer1, which is the lead angle period setting timer in the energization pattern generation unit 15, counts down the count value CNT2 counted in the subsequent 180 degree time during a next subsequent 180 degree time.

The Timer2, which is the soft switching period setting timer in the energization pattern generation unit 15, sets the soft switching driving for Period 20% before and after phase switching of the Hall signal during the next subsequent 180 degree time ((the count value CNT2×Period 20% after phase switching+the count value CNT2×Period 20% before phase switching) of countdown operations).

The Timer3, which is a normal energization period setting timer in the energization pattern generation unit 15, sets a normal energization period (the count value CNT2×Period 60%) during the next subsequent 180 degree time. Specifically, the count value CNT2×Period 60% is counted down at 20% time of the next subsequent 180 degree time, and the count value becomes 0 (zero) at 80% time of the subsequent 180 degree time.

By setting, the previous 180 degree time, (the count value CNT2), the soft switching periods (the count value CNT2×Period 20%×2), and the normal energization period (the count value CNT2×Period 60%), the energization pattern generation unit 15 generates the energization pattern signal Stp. The energization pattern signal Stp gently rises (Period 20%) and falls (Period 20%) (in FIG. 4, the signal is denoted as an energization pattern signal "Stpb"). In the energization pattern signal Stpb, Period 60% is the "High" level period.

In the drive unit 16, the H bridge circuit 27 is soft-switching-driven according to the "Low" level signal Sv1b and the "energization pattern signal Stpb" to output the output signal Sout2 soft-switching-driven. The output signal Sout2 rises (Period 20%) and falls (Period 20%) in a gentle waveform before and after phase switching of the Hall signal. During the periods, the low-side transistor of the H bridge circuit 26 is on, and the output signal Sout1 becomes the "Low" level.

As shown in FIG. 5, the soft switching driving (Period 50% half cycle of sine wave drive) is performed before and after phase switching of the Hall signal in the single phase motor drive circuit 1. The same operation as in FIG. 4 is performed regarding the Hall signal to the Timer1, and hence a description of the operation will be omitted.

The Timer2, which is the soft switching period setting timer in the energization pattern generation unit 15, sets the soft switching driving for Period 50% before and after phase switching of the Hall signal during the subsequent 180 degree time ((the count value CNT1×Period 50% after phase switching+the count value CNT1×Period 50% before phase switching) of countdown operations).

The Timer3, which is the normal energization period setting timer in the energization pattern generation unit 15, does not set the normal energization period.

By setting, the previous 180 degree time, (the count value CNT1), the soft switching periods (the count value CNT1×Period 50%×2), the energization pattern generation unit 15 generates the energization pattern signal Stp. The energization pattern signal Stp has a waveform of a sine wave drive corresponding to the half cycle (in FIG. 5, the signal is denoted as the energization pattern signal "Stpa").

In the drive unit 16, the H bridge circuit 26 is soft-switching-driven according to the "Low" level signal Sv1 and the "energization pattern signal Stpa" to output the output signal Sout1 soft-switching-driven. The output signal Sout1 has a waveform of a sine wave drive corresponding to the half cycle. During the period, the low-side transistor of the H bridge circuit 27 is on, and the output signal Sout2 becomes the "Low" level.

Then, the Timer2, which is the soft switching period setting timer in the energization pattern generation unit 15, sets the soft switching driving for Period 50% before and after phase switching of the Hall signal during the next subsequent 180 degree time ((the count value CNT2×Period 50% after phase switching+the count value CNT2×Period 50% before phase switching) of countdown operations).

The Timer3, which is the normal energization period setting timer in the energization pattern generation unit 15, does not set the normal energization period.

By setting, the previous 180 degree time, (the count value CNT2), the soft switching periods (the count value CNT2× Period 50%×2), the energization pattern generation unit 15 generates the energization pattern signal Stp. The energization pattern signal Stp has a waveform of a sine wave drive corresponding to the half cycle (in FIG. 5, the signal is denoted as the energization pattern signal "Stpb").

In the drive unit 16, the H bridge circuit 27 is soft-switching-driven according to the "Low" level signal Sv1b and the "energization pattern signal Stpb" to output the output signal Sout2 soft-switching-driven. The output signal Sout2 has a waveform of a sine wave drive corresponding to the half cycle. During the period, the low-side transistor of the H bridge circuit 26 is on, and the output signal Sout1 becomes the "Low" level.

Although the soft switching period is herein described taking Period 20% (FIG. 4) and Period 50% (FIG. 5) as examples, it should be noted that the invention is not limited to such soft switching periods. In order to provide the properties required by the single phase motor apparatus, in the single phase motor drive circuit 1 according to the embodiment, the soft switching period can be set to the optimum period (having high versatility).

Next, a relationship between revolutions per minute (rpm) and power consumption of the single phase motor apparatus will be described referring to FIG. 6. Here, a solid line (a) represents a relationship between rpm and power consumption with the soft switching driving (Period 50%×2, a sine wave drive corresponding to the half cycle), a solid line (b) represents a relationship between rpm and power consumption with the soft switching driving (Period 20%×2), and a dashed line (c) represents a relationship between rpm and power consumption without the soft switching driving. The power consumption is normalized.

Figure 6:
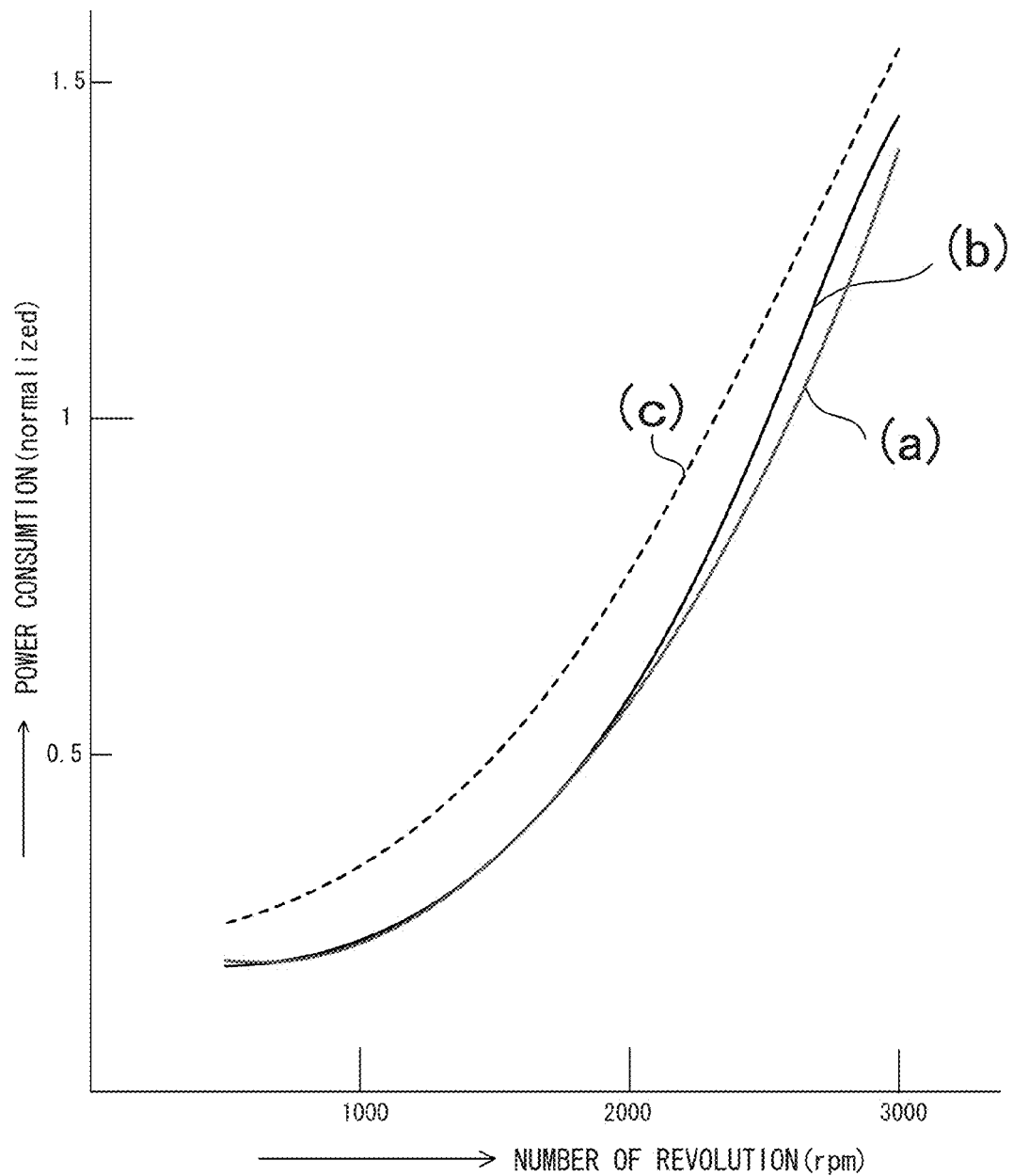
FIG. 6 is a graph showing a relationship between revolutions per minute and power consumption according to the first embodiment.

As shown in FIG. 6, the power consumption can be reduced by the soft switching driving as compared to the case where no soft switching driving is performed. In addition, the power consumption can be further reduced by increasing the soft switching period to conduct the sine wave drive corresponding to the half cycle.

Specifically, the soft switching driving can reduce the power consumption by 30% or more as compared to the case where no soft switching driving is performed at low rpm (not more than 1700 rpm) (there is a small difference between Period 20%×2 and Period 50%×2). The soft switching driving (Period 20%×2) can reduce the power consumption and the soft switching driving (Period 50%×2) can further reduce the power consumption as compared to the case where no soft switching driving is performed at high rpm (not less than 2000 rpm). For example, at 2500 rpm, the power consumption can be reduced by 17% by the soft switching driving (Period 20%×2) and can be reduced by 25% by the soft switching driving (Period 50%×2) as compared to the case where no soft switching driving is performed.

As described above, in the single phase motor drive circuit, the single phase motor apparatus, and the apparatus having a fan according to the embodiment, the single phase motor apparatus includes the single phase motor drive circuit 1, the single phase motor 2, and the Hall element 3. The single phase motor drive circuit 1 includes the comparator 11, the oscillation circuit 12, the counter unit 13, the A/D converter 14, the energization pattern generation unit 15, the drive unit 16, and the terminals Pad1 through Pad8. The comparator output signal Shp-hm and the clock signal Sclk are input to the counter unit 13. The counter unit 13 counts a phase switching time of the Hall signal based on the clock signal Sclk, and outputs the count result as the count signal Scnt. The energization pattern generation unit 15 generates the 180 degree energization pattern Stp based on the 180 degree time of the Hall signal before the energization pattern is generated, and outputs the energization pattern signal Stp to the drive unit 16. The energization pattern Stp is used as a signal to perform the soft switching driving for a predetermined period before and after phase switching of the Hall signal.

Thus, the soft switching driving can reduce the power consumption of the single phase motor apparatus as well as the oscillation and the noise. Since only the cycle information of the Hall signal Shp and the Hall signal Shm is used, an increase in the circuit scale is significantly suppressed. In addition, the effects of the variation and the temperature properties of the Hall element 3 and can be significantly suppressed. Further, in order to provide the properties required by the single phase motor apparatus, the soft switching period can be set to the optimum period. Therefore, the embodiment can be applied to a variety of single phase motor apparatuses.

Figure 7:
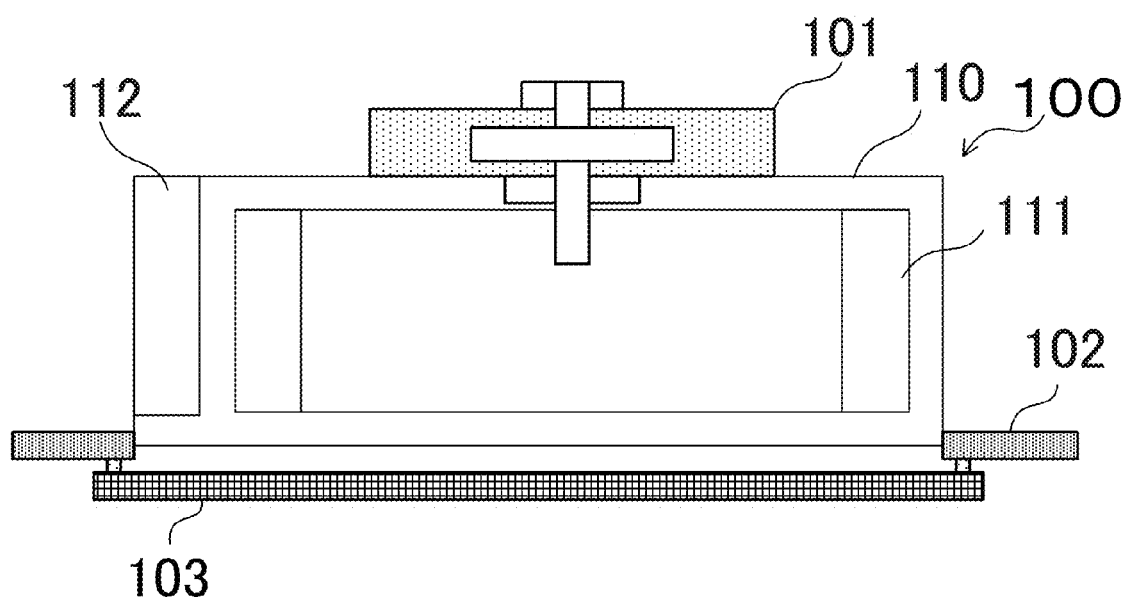
FIG. 7 is a sectional view showing a schematic configuration of a ventilation fan according to a first modification.

Although the single phase apparatus 1 is applied to the refrigerator in the embodiment, the invention is not limited to the refrigerator. For example, the invention may be applied to a ventilation fan as the single phase motor apparatus as shown in FIG. 7.

Specifically, the ventilation fan 100 is mounted on a wall 102 having an opening and exhausts dirty air via a ventilation fan grill to an outside of a room. The ventilation fan 100 includes a single phase motor 101, a housing 110, a fan 111, and an enclosure of electric part 112. The single phase motor 101 is positioned at an upper side of the housing 110. A shaft (not shown) penetrates through the housing 101, and reaches the fan 111. A bearing (not shown) is also disposed at an inner side of the housing 101. The enclosure of electric part 112 is positioned at a left side within the housing 110, and includes the single phase motor drive circuit, the Hall element, and the like.

Thus, the ventilation fan 100 can reduce the power consumption, the oscillation, and the noise. In addition, an increase in the circuit scale can be suppressed, and the enclosure of electric part 112 can have a smaller volume.

The single phase motor apparatus may be applied to the PC and the like that need to be reduced in power consumption and noise, instead of the ventilation fan.

Figure 8:
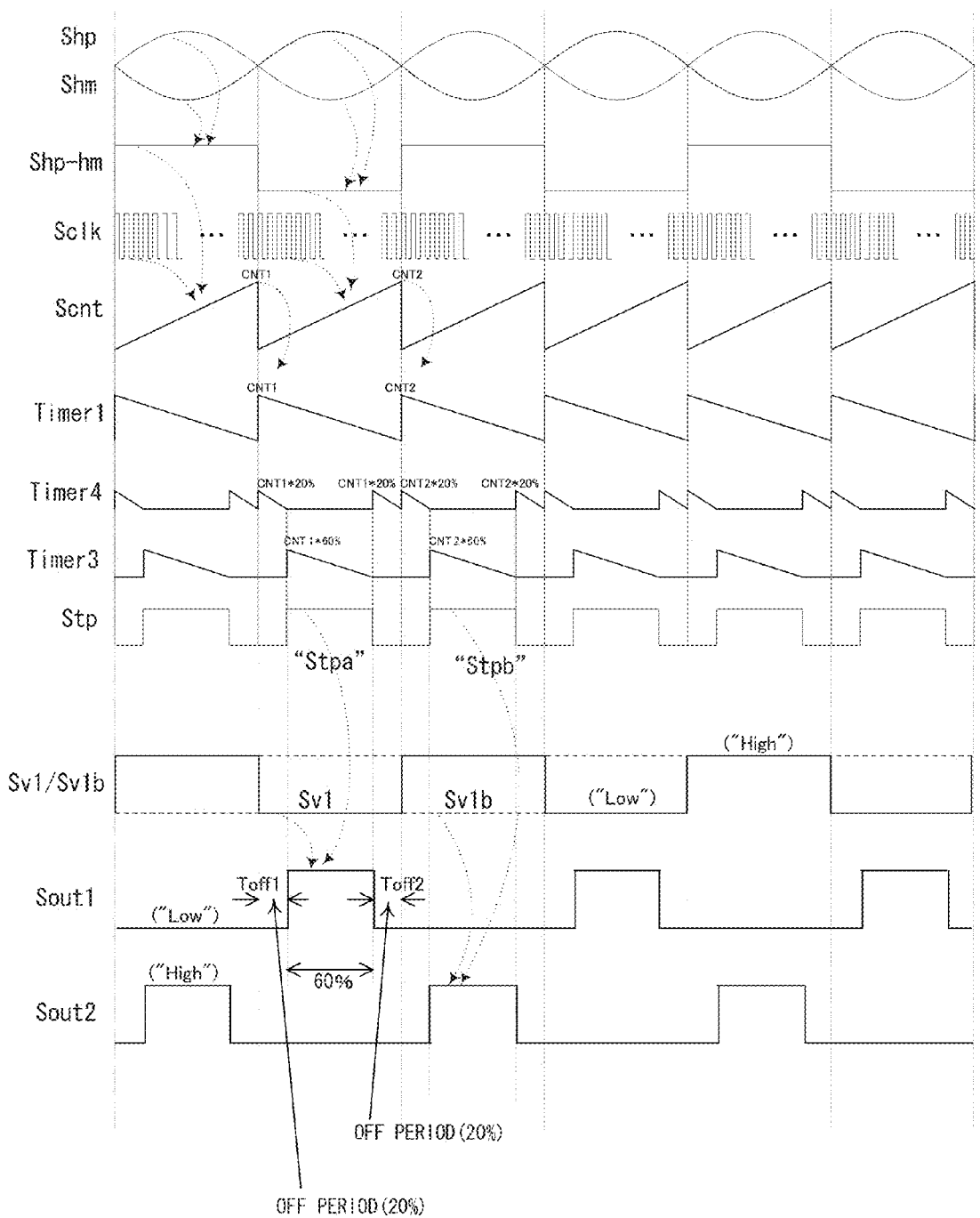
FIG. 8 is a timing chart showing an operation of a single phase motor drive circuit according to a second embodiment.

A second embodiment will be described with reference to FIG. 8. A single phase motor drive circuit, a single phase motor apparatus, and an apparatus having a fan according to the second embodiment will be described with reference to FIG. 8. FIG. 8 is a timing chart showing an operation of the single phase motor drive circuit. In the embodiment, a cycle of a Hall signal is counted, a 180 degree energization pattern is generated based on a 180 degree time of a Hall signal before an energization pattern is generated, and off periods are set before and after phase switching of the Hall signal, thereby reducing power consumption.

The embodiment uses a similar configuration as the single phase motor apparatus according to the first embodiment. The same operation as in the first embodiment (the operation shown in FIG. 4) is performed regarding the Hall signal to the Timer1, which is the lead angle period setting timer in the energization pattern generation unit 15, and hence a description of the operation will be omitted and only different points will be described.

As shown in FIG. 8, according to the embodiment, a Timer4, which is an off period setting timer in the energization pattern generation unit 15, sets the off periods for Period 20% before and after phase switching of the Hall signal during the subsequent 180 degree time ((the count value CNT1×Period 20% after phase switching+the count value CNT1×Period 20% before phase switching) of countdown operations).

The Timer3, is the normal energization period setting timer in the energization pattern generation unit 15, sets the normal energization period (the count value CNT1×Period 60%) during the subsequent 180 degree time.

By setting, the previous 180 degree time, (the count value CNT1), the off periods (the count value CNT1×Period 20%× 2), and the normal energization period (the count value CNT1×Period 60%), the energization pattern generation unit 15 generates the energization pattern signal Stp. In the energization pattern signal Stp, the period from 0% to 20% and the period from 80% to 100% have the "Low" level signal, and the period from 20% to 80% has the "High" level signal (in FIG. 8, the signal is denoted as the energization pattern signal "Stpa").

In the drive unit 16, the H bridge circuit 26 is switching-driven according to the "Low" level signal Sv1 and the "energization pattern signal Stpa" during the period from 20% to 80% to output the output signal Sout1 switching-driven (the "High" level signal). The H bridge circuit 26 turns off during the period from 0% to 20% (an off period Toff1) and the period from 80% to 100% (an off period Toff2). During the periods, the low-side transistor of the H bridge circuit 27 is on, and the output signal Sout2 becomes the "Low" level.

Then, the Timer4, which is the off period setting timer in the energization pattern generation unit 15, sets the off periods for Period 20% before and after phase switching of the Hall signal during the subsequent 180 degree time/the next subsequent 180 degree time ((the count value CNT2×Period 20% after phase switching+the count value CNT2×Period 20% before phase switching) of countdown operations).

The Timer3, is the normal energization period setting timer in the energization pattern generation unit 15, sets the normal energization period (the count value CNT2×Period 60%) during the subsequent 180 degree time/the next subsequent 180 degree time.

By setting, the previous 180 degree time, (the count value CNT2), the off periods (the count value CNT2×Period 20%× 2), and the normal energization period (the count value CNT2×Period 60%), the energization pattern generation unit 15 generates the energization pattern signal Stp. In the energization pattern signal Stp, the period from 0% to 20% and 80% to 100% have the "Low" level signal, and the period from 20% to 80% has the "High" level signal (in FIG. 8, the signal is denoted as the energization pattern signal "Stpb").

In the drive unit 16, the H bridge circuit 27 is switching-driven according to the "Low" level signal Sv1b and the "energization pattern signal Stpb" during the period from 20% to 80% ("High" level signal) to output the output signal Sout2 switching-driven. The H bridge circuit 27 turns off during the period from 0% to 20% (the off period Toff1) and the period from 80% to 100% (the off period Toff2). During the periods, the low-side transistor of the H bridge circuit 26 is on, and the output signal Sout1 becomes the "Low" level.

As described above, in the single phase motor drive circuit, the single phase motor apparatus, and the apparatus having a fan according to the embodiment, the Timer4, which is the off period setting timer in the energization pattern generation unit 15, sets the off periods for Period 20% before and after phase switching of the Hall signal during the subsequent 180 degree time/the next subsequent 180 degree time. The Timer3, which is the normal energization period setting timer in the energization pattern generation unit 15, sets the normal energization period (the count value CNT1×Period 60%, the count value CNT2×Period 60%) during the subsequent 180 degree time/the next subsequent 180 degree time.

Thus, similar effects as the first embodiment can be provided.

Figure 9:
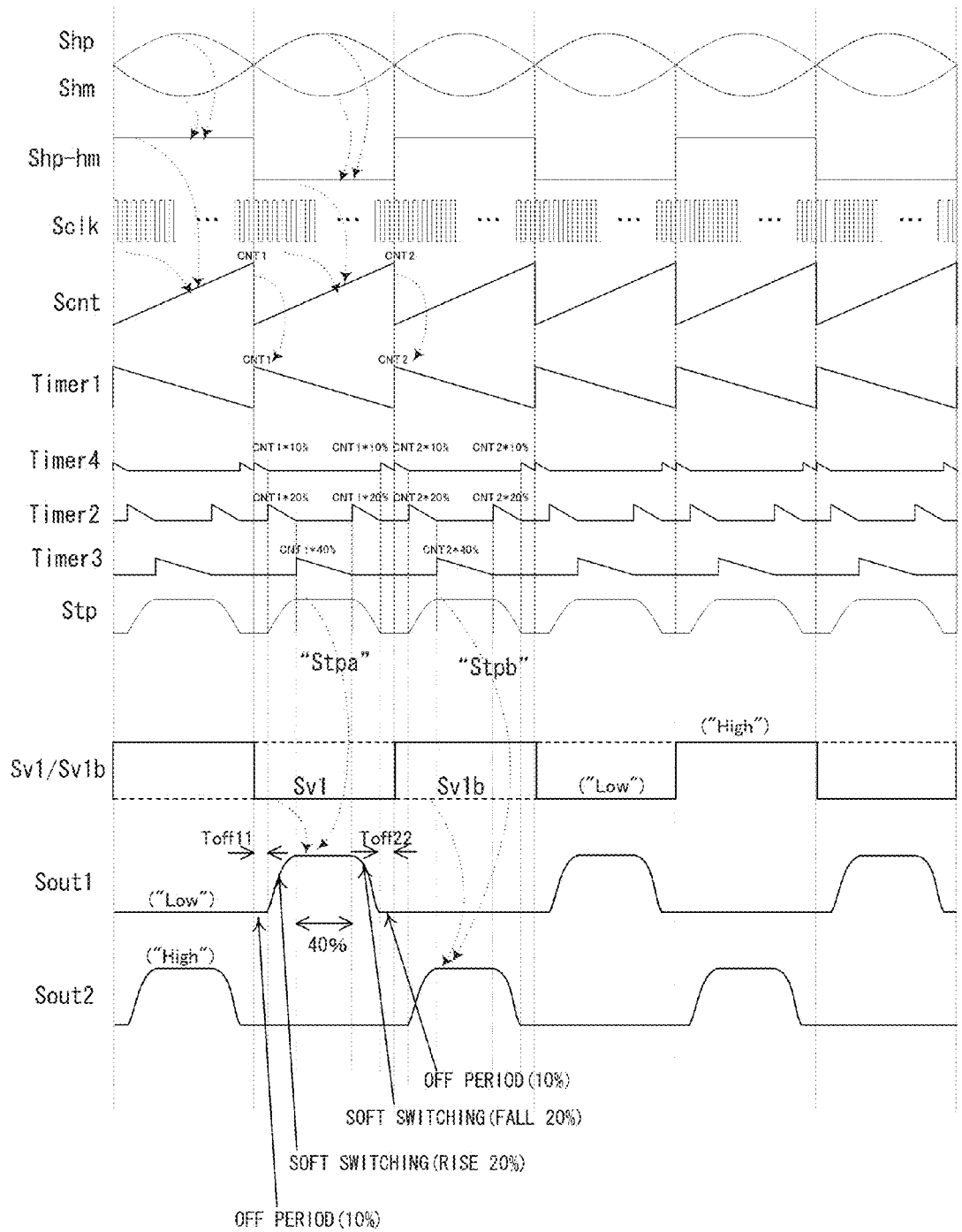
FIG. 9 is a timing chart showing an operation of a single phase motor drive circuit according to a third embodiment.

A third embodiment of the invention will be described with reference to FIG. 9. A single phase motor drive circuit, a single phase motor apparatus, and an apparatus having a fan according to the embodiment will be described with reference to FIG. 9. FIG. 9 is a timing chart showing an operation of the single phase motor drive circuit. In the embodiment, a cycle of the Hall signal is counted, a 180 degree energization pattern is generated based on a 180 degree time of a Hall signal before an energization pattern is generated, and off periods and soft switching operations are set before and after phase switching of the Hall signal, thereby reducing power consumption.

The embodiment uses a similar configuration as the single phase motor apparatus according to the first embodiment. The same operation as in the first embodiment (the operation shown in FIG. 4) is performed regarding the Hall signal to the Timer1, which is the lead angle period setting timer in the energization pattern generation unit 15, and hence a description of the operation will be omitted and only different points will be described.

As shown in FIG. 9, according to the embodiment, the Timer4, which is the off period setting timer in the energization pattern generation unit 15, sets the off periods for Period 10% before and after phase switching of the Hall signal during the subsequent 180 degree time ((the count value CNT1×Period 10% after phase switching+the count value CNT1×Period 10% before phase switching) of countdown operations).

The Timer2, which is the soft switching period setting timer in the energization pattern generation unit 15, sets the soft switching driving for Period 20% at a point shifted for Period 10% before and after phase switching of the Hall signal during the subsequent 180 degree time ((the count value CNT1×Period 20% at a point shifted for Period 10% after phase switching+the count value CNT1×Period 20% at a point shifted for Period 10% before phase switching) of countdown operations).

The Timer3, which is the normal energization period setting timer in the energization pattern generation unit 15, sets a normal energization period (the count value CNT1×Period 40%) during the subsequent 180 degree time.

By setting, the previous 180 degree time, (the count value CNT1), the off periods (the count value CNT1×Period 10%× 2), the soft-switching periods (the count value CNT1×Period 20%×2), and the normal energization period (the count value CNT1×Period 40%), the energization pattern generation unit 15 generates the energization pattern signal Stp. The energization pattern signal Stp is "Low" level for Period 10% before and after phase switching of the Hall signal, and gently rises (the period 20%) and falls (Period 20%) (in FIG. 9, the signal is denoted as the energization pattern signal "Stpa").

In the drive unit 16, according to the "Low" level signal Sv1 and the "energization pattern signal Stpa", the H bridge circuit 26 becomes off for Period 10% (the off period Toff1 and the off period Toff2) before and after phase switching of the Hall signal and is soft-switching-driven for Period 20%×2 to output the output signal Sout1 soft-switching-driven. The output signal Sout1 rises (Period 20%) and falls (Period 20%) in a gentle waveform. During the periods, the low-side transistor of the H bridge circuit 27 is on, and the output signal Sout2 becomes the "Low" level. In the energization pattern signal Stpa, Period 40% is the "High" level period.

Then, the Timer4, which is the off period setting timer in the energization pattern generation unit 15, sets the off periods for Period 10% before and after phase switching of the Hall signal during the next subsequent 180 degree time ((the count value CNT2×Period 10% after phase switching+the count value CNT2×Period 10% before phase switching) of countdown operations).

The Timer2, which is the soft switching period setting timer in the energization pattern generation unit 15, sets the soft switching driving for Period 20% at a point shifted for Period 10% before and after phase switching of the Hall signal during the next subsequent 180 degree time ((the count value CNT2×Period 20% at a point shifted for Period 10% after phase switching+the count value CNT2×Period 20% at a point shifted for Period 10% before phase switching) of countdown operations).

The Timer3, which is the normal energization period setting timer in the energization pattern generation unit 15, sets a normal energization period (a count value CNT2×Period 40%) during the next subsequent 180 degree time.

By setting, the previous 180 degree time, (the count value CNT2), the off periods (the count value CNT2×Period 10%× 2), the soft-switching periods (the count value CNT2×Period 20%×2), and the normal energization period (the count value CNT1×Period 40%), the energization pattern generation unit 15 generates the energization pattern signal Stp. The energization pattern signal Stp is "Low" level for Period 10% before and after phase switching of the Hall signal, and gently rises (the period 20%) and falls (Period 20%) (in FIG. 9, the signal is denoted as the energization pattern signal "Stpb"). In the energization pattern signal Stpb, Period 40% is the "High" level period.

In the drive unit 16, according to the "Low" level signal Sv1b and the "energization pattern signal Stpb", the H bridge circuit 27 becomes off for Period 10% (an off period Toff11 and an off period Toff22) before and after phase switching of the Hall signal and is soft-switching-driven for Period 20%×2 to output the output signal Sout2 soft-switching-driven. The output signal Sout2 rises (Period 20%) and falls (Period 20%) in a gentle waveform. During the periods, the low-side transistor of the H bridge circuit 26 is on, and the output signal Sout1 becomes the "Low" level.

As described above, in the single phase motor drive circuit, the single phase motor apparatus, and the apparatus having a fan according to the embodiment, the Timer4, which is the off period setting timer in the energization pattern generation unit 15, sets the off periods for Period 10% before and after phase switching of the Hall signal during the subsequent 180 degree time/the next subsequent 180 degree time. The Timer2, which is the soft switching period setting timer in the energization pattern generation unit 15, sets the soft switching driving for Period 20% at a point shifted for Period 10% before and after phase switching of the Hall signal during the subsequent 180 degree time/the next subsequent 180 degree time (the count value CNT1×Period 20%×2, the count value CNT2×Period 20%×2). The Timer3, which is the normal energization period setting timer in the energization pattern generation unit 15, sets the normal energization period (the count value CNT1×Period 40%, the count value CNT2×Period 40%) during the subsequent 180 degree time/the next subsequent 180 degree time.

Thus, in addition to similar effects as the first embodiment, the power consumption can be further reduced as compared with the first embodiment because there are the off periods before and after phase switching of the signal within the same normal energization period.

Figure 10:
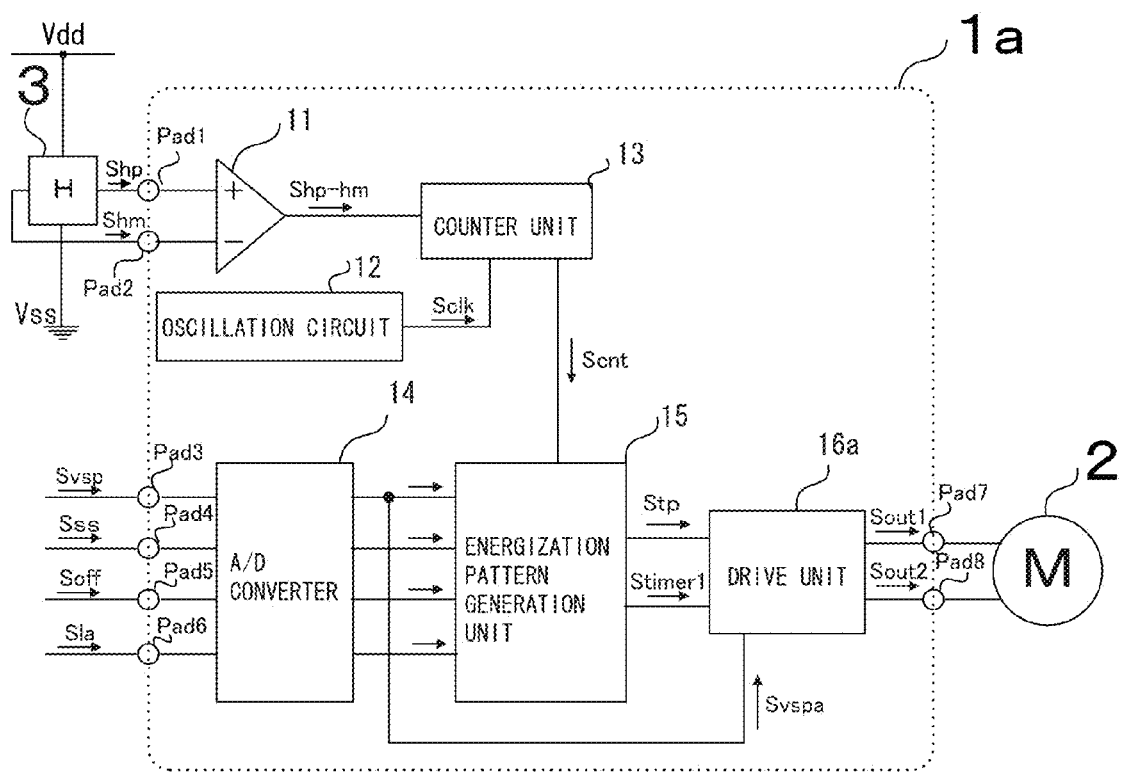
FIG. 10 is a block diagram of a schematic configuration of a single phase motor apparatus according to a fourth embodiment.
Figure 11:
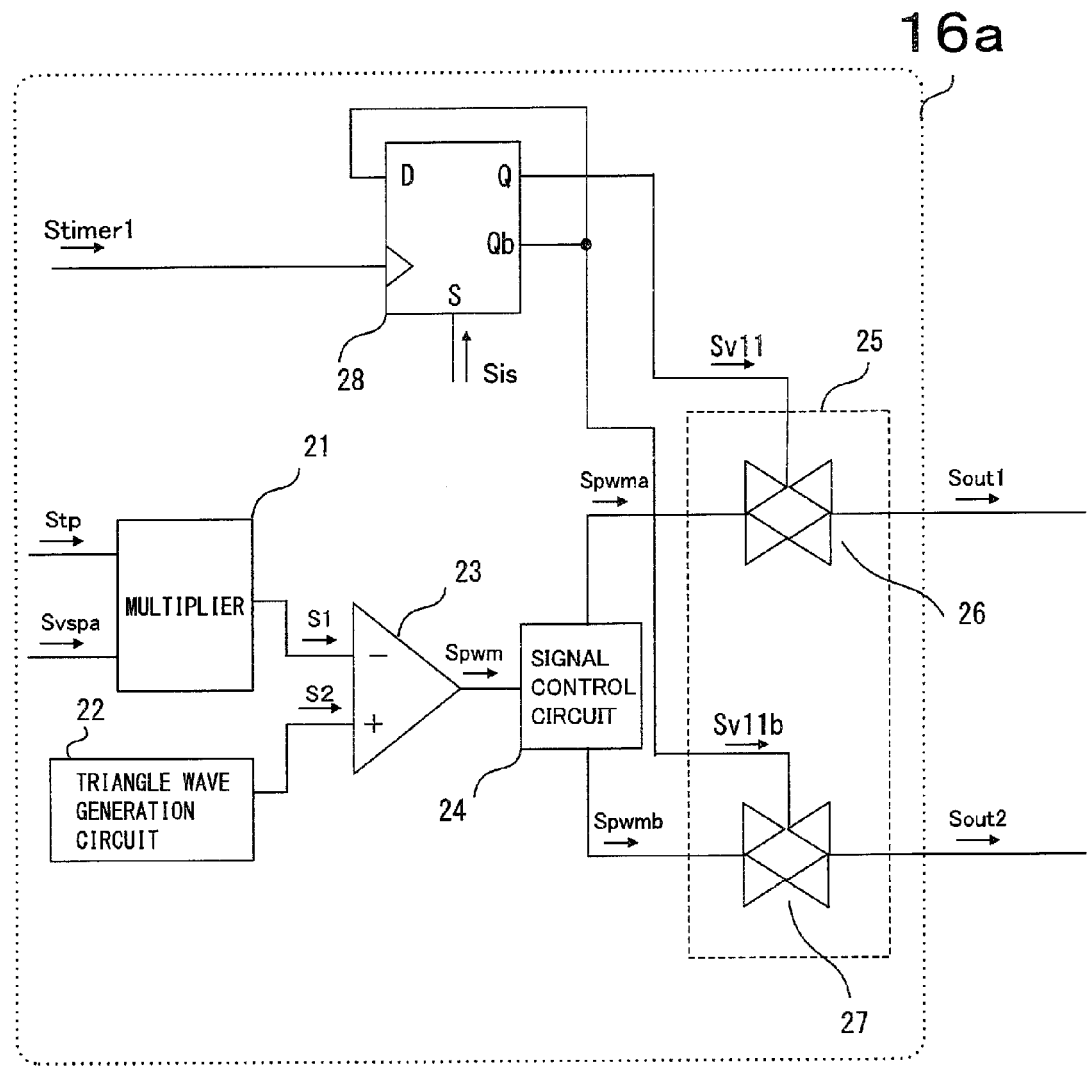
FIG. 11 is a circuit diagram showing a configuration of a drive unit according to the fourth embodiment.

A fourth embodiment will be described with reference to FIGS. 10 to 12. A single phase motor drive circuit, a single phase motor apparatus, and an apparatus having a fan according to the embodiment will be described with reference to FIGS. 10 to 12. FIG. 10 is a block diagram of a schematic configuration of the single phase motor apparatus. FIG. 11 is a circuit diagram showing a configuration of the drive unit. In the embodiment, a cycle of the Hall signal is counted, a 180 degree energization pattern is generated based on a 180 degree time of the Hall signal before an energization pattern is generated, off periods, soft switching operations, and a lead angle period are set before and after phase switching of the Hall signal, thereby reducing power consumption.

As shown in FIG. 10, the single phase motor apparatus includes a single phase motor drive circuit 1a, the single phase motor 2, and the Hall element 3.

The single phase motor drive circuit 1a performs soft switching operations before and after phase switching of the Hall signal, thereby reducing power consumption in the single phase motor drive. The single phase motor drive circuit 1a can reduce the oscillation and the noise by the soft switching operations. Since the single phase motor drive circuit 1a uses only the cycle information of the Hall signal Shp and the Hall signal Shm, an increase in the circuit scale is significantly suppressed. In addition, effects of a variation of the Hall element 3 and temperature properties can be significantly suppressed.

As shown in FIG. 10, the single phase motor drive circuit 1a includes the comparator 11, the oscillation circuit 12, the counter unit 13, the A/D converter 14, the energization pattern generation unit 15, a drive unit 16a, and the terminals Pad1 through Pad8. The embodiment has the drive unit 16a having a different configuration from that of the drive unit 16 in the first embodiment, and hence only different points will be described.

The drive unit 16a includes the multiplier 21, the triangle wave generation circuit 22, the pulse width modulation circuit 23, the signal control circuit 24, the output unit 25, and a flip flop 28.

The flip flop 28 inputs an Stimer1 signal of the Timer1 as a clock. The Stimer1 signal is output from the energization pattern generation unit 15. The flip flop 28 latches information of a D port at a rising edge of the Stimer1 signal. The Stimer1 signal is set to a "High" level signal when a counter value is 0 (zero). The flip flop 28 outputs a signal Sv11b from a Qb port, and returns and inputs information of the Qb port to the D port. The flip flop 28 outputs a signal Sv11 from a Q port. An initial value of the flip flop 28 is set according to a signal Sis input to an S port. The Signal Sis is a signal based on a comparator output signal Shp-hm.

The signal Sv11b is a signal having an opposite phase of the signal Sv11. The signal Sv11 is output to an H bridge circuit 26 of the output unit 25. The signal Sv11b is output to an H bridge circuit 27 of the output unit 25.

Here, the flip flop 28 generates the signals Sv11, Sv11b that are phase-shifted for a lead angle period Tla33 from the signals Sv1, Sv1b of the first embodiment.

Next, an operation of the single phase motor drive circuit will be described referring to FIG. 12. FIG. 12 is a timing chart showing the operation of the single phase motor drive circuit. The same operation as in the first embodiment (the operation shown in FIG. 4) is performed regarding the Hall signal to the counter unit 13, and hence a description of the operation will be omitted and only different points will be described.

Figure 12:
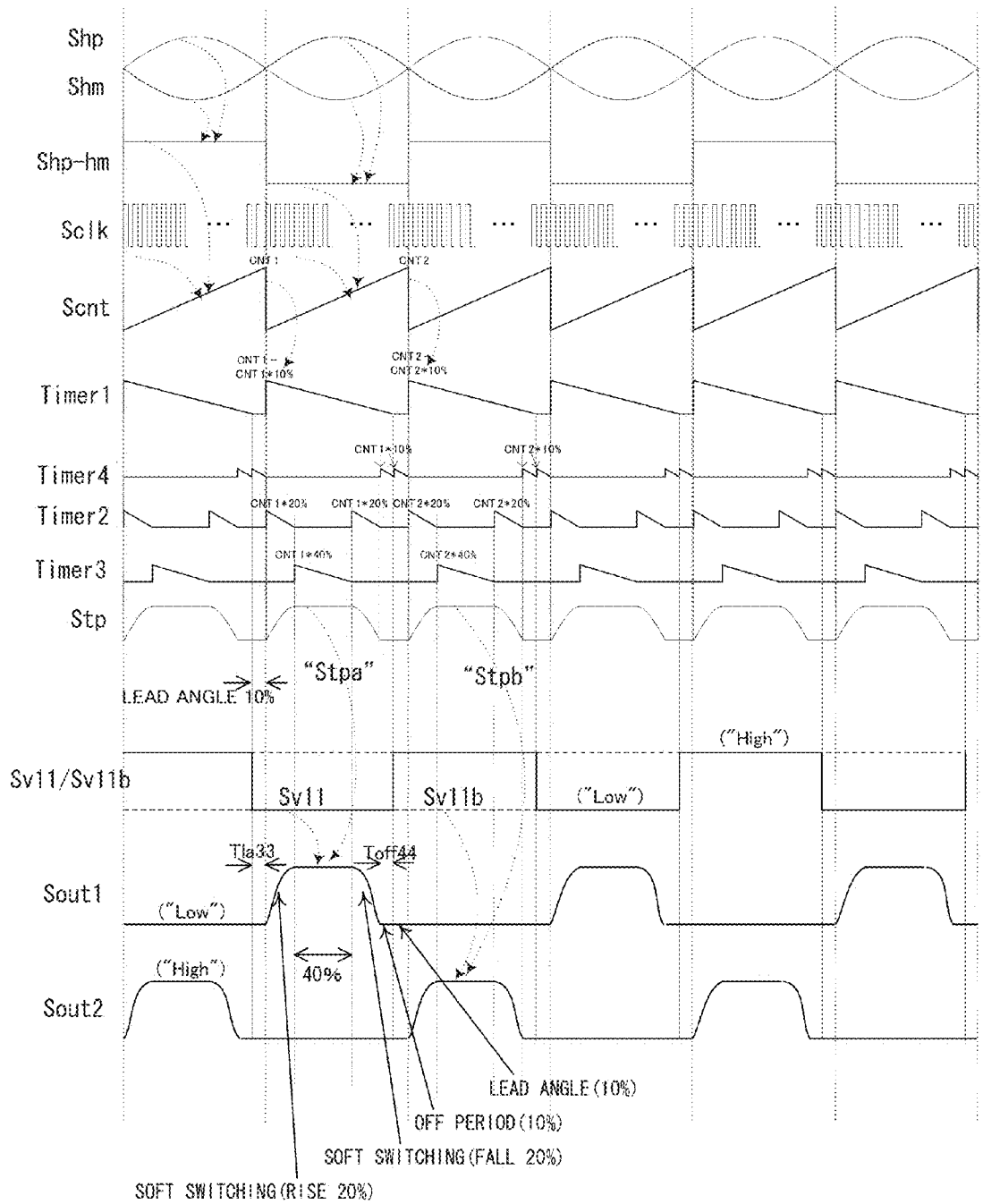
FIG. 12 is a timing chart showing an operation of a single phase motor drive circuit according to the fourth embodiment.

As shown in FIG. 12, the Timer1, which is the lead angle period setting timer in the energization pattern generation unit 15, counts down the count value CNT1 counted in the previous 180 degree time. Specifically, a count value {CNT1−(CNT1×Period 10%)} is counted down at 0% time of the subsequent 180 degree time. The count value becomes 0 (zero) at 90% time of the subsequent 180 degree time. The lead angle period is set for Period 10%, i.e., during the period from 90% to 100% in the subsequent 180 degree time.

The Timer4, which is the off period setting timer in the energization pattern generation unit 15, sets the off periods for Period 10%, i.e., during the period from 80% to 90%, and for Period 10%, i.e., during the period from 90% to 100% in the subsequent 180 degree time (the count value CNT1×Period 10%×2).

The Timer2, which is the soft switching period setting timer in the energization pattern generation unit 15, sets the soft switching driving for Period 20% i.e., during the period from 0% to 20%, and for Period 20%, i.e., during the period from 60% to 80% in the subsequent 180 degree time (the count value CNT1×Period 20%×2).

The Timer3, which is the normal energization period setting timer in the energization pattern generation unit 15, sets the normal energization period (Period 40%, i.e., during the period from 20% to 60%) during the subsequent 180 degree time.

By setting, the previous 180 degree time, the count value CNT1, the lead angle period (the count value CNT1×Period 10%), the off periods (the count value CNT1×Period 10%), the soft switching driving (the count value CNT1×Period 20%×2), and the normal energization period (the count value CNT1×Period 40%), the energization pattern generation unit 15 generates the energization pattern signal Stp. The energization pattern signal Stp gently rises during the period from 0% to 20% and falls during the period from 60% to 80%. The period from 80% to 100% becomes the "Low" level period (in FIG. 12, the signal is denoted as the energization pattern signal "Stpa").

In the drive unit 16a, the H bridge circuit 26 is soft-switching-driven from 0% to 20% and from 60% to 80% according to the "Low" level signal Sv11 and the "energization pattern signal Stpa" to output the output signal Sout1 that is off during the period from 80% to 90% (an off period Toff44). In the energization pattern signal Stpa, Period 40% is the "High" level period. The output signal Sout1 becomes the "Low" level according to the "High" level signal Sv11 and "the energization pattern signal Stpa" when the H bridge circuit 26 is during the period from 90% to 100% (the lead angle period Tla33). The output signal Sout1 rises (Period 20%, i.e., during the period from 0% to 20%) and falls (during the period from 60% to 80%) in a gentle waveform. During the period from 0% to 90%, the low-side transistor of the H bridge circuit 27 is on, and the output signal Sout2 becomes the "Low" level. During the period from 90% to 100%, the output signal Sout2 turns off.

Then, the Timer1, which is the lead angle period setting timer in the energization pattern generation unit 15, counts down the count value CNT2 counted in the previous 180 degree time. Specifically, a count value {CNT2−(CNT2×Period 10%)} is counted down at 0% time of the next subsequent 180 degree time. The count value is 0 (zero) at 90% time of the next subsequent 180 degree time. The lead angle period is set for Period 10%, i.e., during the period from 90% to 100% in the next subsequent 180 degree time.

The Timer4, which is the off period setting timer in the energization pattern generation unit 15, sets the off periods for Period 10%, i.e., during the period from 80% to 90%, and for Period 10%, i.e., during the period from 90% to 100% in the next subsequent 180 degree time (the count value CNT2×Period 10%×2).

The Timer2, which is the soft switching period setting timer in the energization pattern generation unit 15, sets the soft switching driving for Period 20% i.e., during the period from 0% to 20%, and for Period 20%, i.e., during the period from 60% to 80% in the subsequent 180 degree time (the count value CNT2×Period 20%×2).

The Timer3, which is the normal energization period setting timer in the energization pattern generation unit 15, sets the normal energization period (Period 40%, i.e., during the period from 20% to 60%) during the subsequent 180 degree time.

By setting, the previous 180 degree time (the count value CNT2), the lead angle period (the count value CNT2×Period 10%), the off periods (the count value CNT2×Period 10%), the soft switching driving (the count value CNT2×Period 20%×2), and the normal energization period (Period 40%), the energization pattern generation unit 15 generates the energization pattern signal Stp. The energization pattern signal Stp gently rises during the period from 0% to 20% and falls during the period from 60% to 80%. The period from 80% to 100% becomes the "Low" level period (in FIG. 12, the signal is denoted as the energization pattern signal "Stpb").

In the drive unit 16, the H bridge circuit 27 is soft-switching-driven during the period from 0% to 20% and 60% to 80% according to the "Low" level signal Sv11b and the "energization pattern signal Stpb" to output the output signal Sout2 that is off during the period from 80% to 90% (the off period Toff44). In the energization pattern signal Stpb, Period 40% is the "High" level period. The output signal Sout2 becomes the "Low" level according to the "High" level signal Sv11b and the energization pattern signal Stpa when the H bridge circuit 27 is during the period from 90% to 100% (the lead angle period Tla33). The output signal Sout2 rises (Period 20%, i.e., during the period from 0% to 20%) and falls (during the period from 60% to 80%) in a gentle waveform. During the period from 0% to 90%, the low-side transistor of the H bridge circuit 26 is on, and the output signal Sout1 becomes the "Low" level. During the period from 90% to 100%, the output signal Sout1 turns off.

As described above, in the single phase motor drive circuit, the single phase motor apparatus, and the apparatus having a fan according to the embodiment, the Timer1, which is the lead angle period setting timer in the energization pattern generation unit 15, counts down the count value CNT1 counted in the previous 180 degree time from the count value {CNT1−(CNT1×Period 10%)} during the subsequent 180 degree time, and counts down the count value CNT2 counted in the subsequent 180 degree time from the count value {CNT2−(CNT2×Period 10%)} during a next subsequent 180 degree time. The lead angle period (10%) is set in each subsequent 180 degree time. The Timer4, which is the off period setting timer in the energization pattern generation unit 15, sets the off periods for Period 10%, i.e., during the period from 80% to 90%, and for Period 10%, i.e., during the period from 90% to 100% the subsequent 180 degree time. The Timer2, which is the soft switching period setting timer in the energization pattern generation unit 15, sets the soft switching driving for Period 20% i.e., during the period from 0% to 20%, and for Period 20%, i.e., during the period from 60% to 80% in the subsequent 180 degree time. The Timer3, which is the normal energization period setting timer in the energization pattern generation unit 15, sets the normal energization period (Period 40%, i.e., during the period from 20% to 60%) during the subsequent 180 degree time.

Thus, the similar effects as the first embodiment can be provided.

In each of the first to fourth embodiments, the energization pattern generation unit 15 generates the 180 degree energization pattern based on the 180 degree time of the Hall signal immediately before the energization pattern generation unit 15 generates the energization pattern. Alternatively, the 180 degree energization pattern may be generated based on a 180 degree time of the Hall signal one cycle before.

Although the drive unit 16a having the flip flop 28 is used in the fourth embodiment, the drive unit 16a may be used in each of the first to third embodiments. In this case, the lead angle period may be set to be 0 (zero).

While certain embodiments have been described, these embodiments have been presented by way of example only, and are not intend to limit the scope of the inventions. Indeed, the novel embodiments described herein may be embodied in a variety of the other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A single phase motor drive circuit, comprising:
   a counter unit to count a time of phase switching of a Hall signal based on a clock signal;
   an energization pattern generation unit to have a Timer set a time of a normal energization pattern to be shorter than the time of phase switching based on the count result of the counter unit, and to generate an energization pattern signal based on the Timer; and
   a drive unit to generate a pulse width modulation (PWM) signal based on a duty setting signal and the energization pattern signal, and to output an output signal to drive a single phase motor based on the PWM signal.

2. The single phase motor drive circuit according to claim 1, wherein the energization pattern generation unit controls a rise time and a fall time of the energization pattern signal using the Timer so as to slow a rise and a fall of the energization pattern signal based on a soft switching period setting signal.

3. The single phase motor drive circuit according to claim 1, wherein the energization pattern generation unit sets the energization pattern signal to a low level for a first predetermined period based on an off period setting signal, and controls a rise time and a fall time of the energization pattern signal using the Timer so as to slow a rise and a fall of the energization pattern signal based on a soft switching period setting signal.

4. The single phase motor drive circuit according to claim 1, wherein the energization pattern generation unit includes:
   a Timer1 serving as a lead angle period setting timer,
   a Timer2 serving as a soft switching period setting timer,
   a Timer3 serving as a normal energization period setting timer, and
   a Timer4 serving as an off period setting timer, and
   wherein the energization pattern generation unit generates the energization pattern by using at least two of the Timer1, the Timer2, the Timer3, and the Timer4.

5. The single phase motor drive circuit according to claim 4, wherein the energization pattern generation unit generates the energization pattern having a sine wave with a half cycle by using the Timer1 and the Timer2.

6. The single phase motor drive circuit according to claim 4, wherein the energization pattern generation unit generates the energization pattern with a half cycle in which the energization pattern signal gently rises and falls, by using the Timer1, the Timer2, and the Timer3 to generate respectively a first period for which the energization pattern signal gently rises, a second period for which the energization pattern signal is at a high level, and a third period for which the energization pattern signal gently falls.

7. The single phase motor drive circuit according to claim 4, wherein the energization pattern generation unit generates the energization pattern with a half cycle in which a predetermined off period is set, by using the Timer1, the Timer2, and the Timer4 to generate respectively a first period for which the energization pattern signal is at a low level, a second period for which the energization pattern signal is at a high level, and a third period for which the energization pattern signal is at a low level.

8. The single phase motor drive circuit according to claim 4, wherein the energization pattern generation unit generates the energization pattern with a half cycle in which a predetermined off period is set and the energization pattern signal gently rises and falls, by using the Timer1, the Timer2, and the Timer3, and the Timer4 to generate respectively a first period for which the energization pattern signal is at a low level, a second period for which the energization pattern signal gently rises, a third period for which the energization pattern signal is at a high level, a fourth period for which the energization pattern signal gently falls, and a fifth period for which the energization pattern signal is at a low level.

9. The single phase motor drive circuit according to claim 4, wherein the energization pattern generation unit generates the energization pattern with a half cycle in which a predetermined lead angle period is set, a predetermined off period is set, and the energization pattern signal gently rises and falls, by using the Timer1, the Timer2, and the Timer3, and the Timer4 to generate respectively a first period for which the energization pattern signal gently rises, a second period for which the energization pattern signal is at a high level, a third period for which the energization pattern signal gently falls, and a fourth period for which the energization pattern signal is at a low level, the predetermined off period being set after the energization pattern signal gently falls.

10. The single phase motor drive circuit according to claim 4, wherein:
    the drive unit generates a first PWM signal and a second PWM signal having a different enable period from an enable period of the first PWM signal, and
    the drive unit includes:
        a flip flop to receive a second signal output from the Timer1,
        a first H bridge circuit to generate a first output signal based on the first PWM signal and a third signal output from the flip flop to output the first output signal to the single phase motor, and
        a second H bridge circuit to generate a second output signal based on the second PWM signal and a reverse signal of the third signal to output a second output signal to the single phase motor, the second output signal being shifted by a half cycle from the first output signal.

11. A single phase motor drive circuit comprising:
    a counter unit to count a time of phase switching of a Hall signal based on a clock signal;
    an energization pattern generation unit to generate an energization pattern based on the count result of the counter unit, to shift an energization pattern signal by a second predetermined period based on a lead angle period setting signal, to set the energization pattern signal to a low level for a third predetermined period based on an off period setting signal, and to slow a rise and a fall of the energization pattern signal based on a soft switching period setting signal; and a drive unit to generate a pulse width modulation (PWM) signal based on a duty setting signal and the energization pattern signal, and to output an output signal to drive a single phase motor based on the PWM signal.

12. The single phase motor drive circuit according to claim 11, wherein the duty setting signal, the lead angle period setting signal, the off period setting signal, and the soft switching period setting signal are signals analog-to-digital converted by an analog-to-digital converter.

13. The single phase motor drive circuit according to claim 11, further comprising:

an oscillation circuit to generate the clock signal and output the clock signal to the counter unit; and a comparator to receive a first Hall signal output from a Hall element and a second Hall signal having an opposite phase of the first Hall signal and to output a first signal to the counter unit, the first signal being obtained by comparing and amplifying the first Hall signal and the second Hall signal.

14. The single phase motor drive circuit according to claim 13, wherein:

the drive unit generates a first PWM signal and a second PWM signal having a different enable period from an enable period of the first PWM signal, and the drive unit includes:

a first H bridge circuit to generate a first output signal based on the first signal and the first PWM signal to output the first output signal to the single phase motor, and a second H bridge circuit to generate a second output signal based on a reverse signal of the first signal and the second PWM signal to output a second output signal to the single phase motor, the second output signal being shifted by a half cycle from the first output signal.

15. An apparatus, comprising:

a fan;

a single phase motor; and a single phase motor drive circuit including:

a counter unit to count a time of phase switching of a Hall signal based on a clock signal, an energization pattern generation unit to have a Timer set a time of a normal energization pattern to be shorter than the time of phase switching based on the count result of the counter unit, and to generate an energization pattern signal based on the Timer, and a drive unit to generate a pulse width modulation (PWM) signal based on a duty setting signal and the energization pattern signal, and to output a first output signal and a second output signal to drive the single phase motor based on the PWM signal, the second output signal being shifted by a half cycle from the first output signal, wherein the single phase motor operates based on the first output signal and the second output signal, wherein a high level period of the first output signal is shorter than a low level period of the second output signal, and wherein a high level period of the second output signal is shorter than a low level period of the first output signal.

16. The apparatus according to claim 15, wherein the apparatus is applied to one of a refrigerator, a ventilation fan, and a personal computer.

* * * * *